(12) United States Patent
Moon et al.

(10) Patent No.: US 10,157,148 B2
(45) Date of Patent: Dec. 18, 2018

(54) SEMICONDUCTOR DEVICE CONFIGURED TO CONTROL A WEAR LEVELING OPERATION AND OPERATING METHOD THEREOF

(71) Applicant: SK hynix Inc., Icheon-si, Gyeonggi-do (KR)

(72) Inventors: Young-Suk Moon, Yongin-si Gyeonggi-do (KR); Hong-Sik Kim, Seongnam-si Gyeonggi-do (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 521 days.

(21) Appl. No.: 14/512,885

(22) Filed: Oct. 13, 2014

(65) Prior Publication Data

US 2015/0149728 A1 May 28, 2015

(30) Foreign Application Priority Data

Nov. 28, 2013 (KR) ........................ 10-2013-0146568

(51) Int. Cl.
*G06F 12/123* (2016.01)
*G06F 12/0868* (2016.01)

(52) U.S. Cl.
CPC ........ *G06F 12/123* (2013.01); *G06F 12/0868* (2013.01); *G06F 2212/312* (2013.01); *G06F 2212/466* (2013.01); *G06F 2212/7204* (2013.01)

(58) Field of Classification Search
None
See application file for complete search history.

(56) References Cited

U.S. PATENT DOCUMENTS

| 5,996,055 A | * | 11/1999 | Woodman | G06F 12/128 711/203 |
| 8,285,936 B2 | | 10/2012 | Roberts et al. | |
| 2008/0162786 A1 | * | 7/2008 | Shanmuganathan | G06F 12/0246 711/103 |
| 2012/0151141 A1 | * | 6/2012 | Bell, Jr. | G06F 11/3485 711/118 |

(Continued)

FOREIGN PATENT DOCUMENTS

KR       1020100030602 A       3/2010

OTHER PUBLICATIONS

"Digital semiconductor alpha 21264 microprocessor product brief". Aug. 1997. USA. Digital Equipment Corporation. Website: <http://sup.xenya.si/sup/info/digital/Alpha/21264pb.pdf>.*

*Primary Examiner* — Reginald G Bragdon
*Assistant Examiner* — James J. Thomas
(74) *Attorney, Agent, or Firm* — William Park & Associates Ltd.

(57) ABSTRACT

A semiconductor device may include a first address cache configured to store a physical address of a semiconductor memory device and a write count associated with the physical address, an address monitor configured to update the physical address and the write count in the first address cache based on a received write request, and an arbiter configured to store a write address and write data associated with the write request in a write cache in response to a command from the address monitor, wherein the command generated by the address monitor is based on whether an update is made to the physical address and the write count in first address cache.

16 Claims, 8 Drawing Sheets

(56) References Cited

U.S. PATENT DOCUMENTS

| | | | | |
|---|---|---|---|---|
| 2012/0265925 A1* | 10/2012 | Miura | ............ | G06F 12/0246 |
| | | | | 711/103 |
| 2014/0052917 A1* | 2/2014 | Koka | ............ | G06F 12/0811 |
| | | | | 711/120 |
| 2014/0237160 A1* | 8/2014 | Dong | ............ | G06F 12/0864 |
| | | | | 711/102 |

* cited by examiner

FIG. 2

| V | Address | Write Count | LRU |
|---|---------|-------------|-----|
| V | Address | Write Count | LRU |
| V | Address | Write Count | LRU |
| V | Address | Write Count | LRU |
| V | Address | Write Count | LRU |
| V | Address | Write Count | LRU |
| V | Address | Write Count | LRU |
| V | Address | Write Count | LRU |

311 / 312 / 313 / 314

300

SEMICONDUCTOR DEVICE CONFIGURED TO CONTROL A WEAR LEVELING OPERATION AND OPERATING METHOD THEREOF

CROSS-REFERENCE TO RELATED APPLICATIONS

The present application claims priority of Korean Patent Application No. 10-2013-0146568, filed on Nov. 28, 2013, which is incorporated herein by reference in its entirety.

BACKGROUND

1. Field

Various embodiments relate to a semiconductor device and an operating method thereof, and more particularly, to a semiconductor device configured to control a wear leveling operation of a semiconductor memory device, and an operating method thereof.

2. Description of the Related Art

A semiconductor memory device, such as for example a NAND flash memory device or phase change memory device, may have a relatively limited number of write requests that can be performed on a cell before the performance of that cell begins to deteriorate. For example, the limited amount of write requests may range from $10^6$ to $10^8$ for a phase change memory device.

In some cases, when write operations are relatively concentrated in a specific cell region, the lifespan of the entire memory device may be reduced. A wear leveling operation is often performed to uniformly distribute write operations over entire cell regions of the semiconductor memory device.

Typically when a write request is performed, a logical address received from a host is mapped to a physical address of the semiconductor memory device, and the write request is performed at the mapped physical address.

SUMMARY

In an embodiment, a semiconductor device may include a first address cache configured to store a physical address of a semiconductor memory device and a write count associated with the physical address, an address monitor configured to update the physical address and the write count in the first address cache based on a received write request, and an arbiter configured to store a write address and write data associated with the write request in a write cache in response to a command from the address monitor, wherein the command generated by the address monitor is based on whether an update is made to the physical address and the write count in first address cache.

In an embodiment, a system may include a semiconductor memory device, and a controller configured to control the semiconductor memory device. The controller may include an address cache configured to store a physical address of a semiconductor memory device and a write count associated with the physical address, an address monitor configured to update the physical address and the write count in the address cache based on a received write request, and an arbiter configured to store a write address and write data associated with the write request in a write cache in response to a command from the address monitor, wherein the command generated by the address monitor is based on whether an update is made to the physical address and the write count in first address cache.

In an embodiment, an operating method of a semiconductor device may include determining whether a write address associated with a write request is present in a first address cache, and performing the write request on a write cache when a write count associated with the write address stored in the first address cache exceeds a threshold value.

BRIEF DESCRIPTION OF THE DRAWINGS

FIG. 2 illustrates the data structure of an embodiment of an address cache;

DETAILED DESCRIPTION

Figure 1:
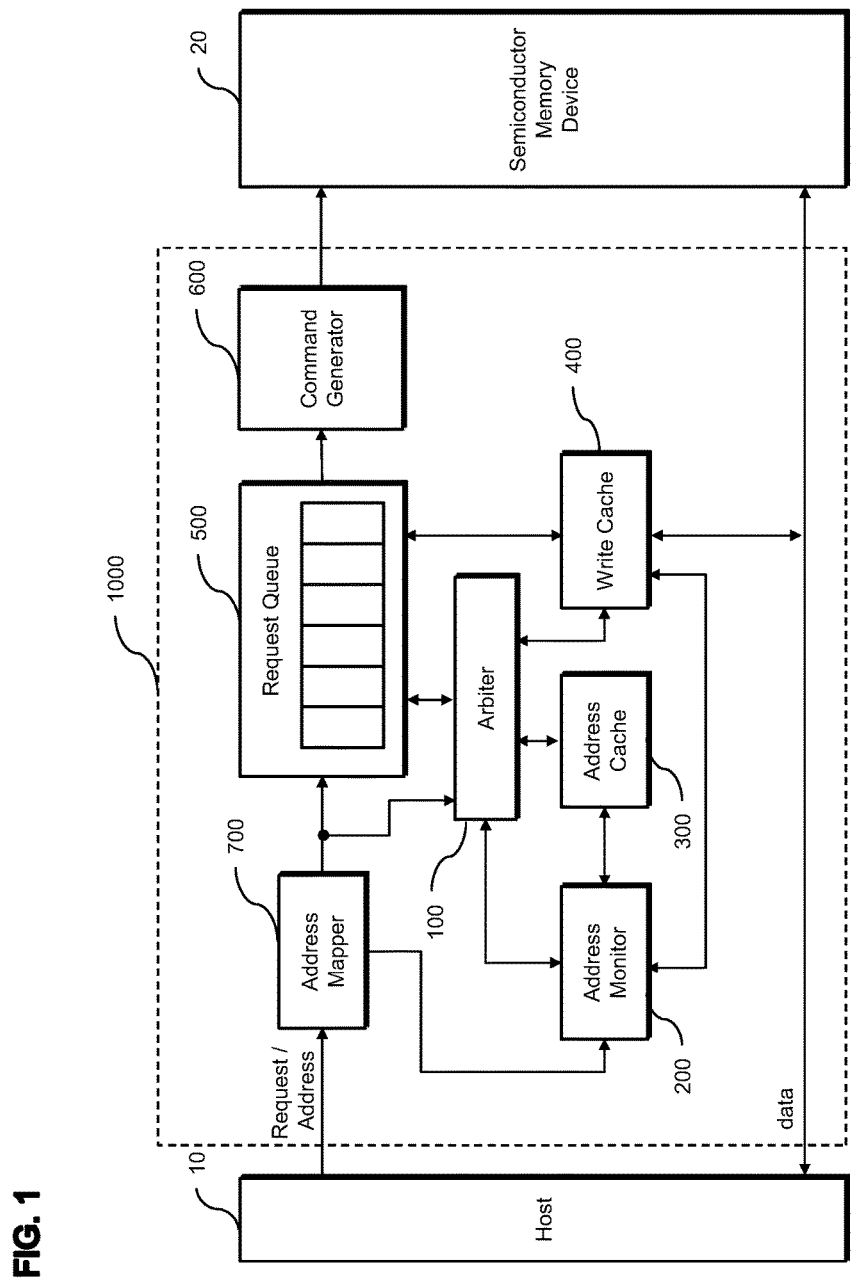
FIG. 1 is a block diagram representation of a system including an embodiment of a semiconductor device.

Various embodiments will be described below in more detail with reference to the accompanying drawings. Throughout the disclosure, like reference numerals refer to like parts throughout the various figures and embodiments.

FIG. 1 is a block diagram representation of a system including an embodiment of a semiconductor device 1000.

The semiconductor device 1000 receives a read/write request from a host 10 and controls one or more operations of a semiconductor memory device 20 in accordance with the received read/write request. The semiconductor memory device 20 may include a NAND flash memory device and a phase change memory device, but is not limited thereto.

An address mapper 700 converts a logical address received from the host 10 into a physical address. For example, the address mapping may be accomplished by performing an XOR operation on the physical address and key data.

An embodiment of the semiconductor device 1000 may perform a wear leveling operation on the semiconductor memory device 20.

For example, the wear leveling operation may be performed by changing the mapping relationships between logical addresses and physical addresses following a predetermined number of write counts.

The operation of changing the mapping relationships may be performed in a number of different ways. In an embodiment, an address swapping method may be used where two logical addresses are selected at a time and physical addresses corresponding to the two selected logical addresses are swapped.

For example, when first and second logical addresses L1, L2 are mapped to first and second physical addresses P1, P2, respectively, the physical addresses corresponding to the logical addresses may be swapped. More specifically, the first logical address L1 may be mapped to the second physical address P2 and the second logical address L2 may be mapped to the first physical address P1.

The swap operation for two logical addresses at a time is sequentially performed on the entire memory address region for wear leveling operation. Hereafter, a round refers to a period when a swap operation for the entire memory address region is performed. In many cases, write requests may be relatively more concentrated on the logical addresses where the mapping relationships have been changed. Mapping relationships cannot be changed until a round associated with a swap operation has been completed. It is possible that the physical addresses associated with the logical addresses associated with relatively more concentrated write requests may deteriorate while a round is being performed.

A state where write requests are relatively more concentrated on a specific physical address will be expressed as a state associated with that physical address where the physical address is relatively more likely to be attacked.

A physical address that is relatively more likely to be attacked may be stored in a separate cache. A write or read request for a physical address that is relatively more likely to be attacked may be performed through the separate cache.

An embodiment of the semiconductor device 1000 may include an arbiter 100, an address monitor 200, an address cache 300, a write cache 400, a request queue 500, a command generator 600 and an address mapper 700.

The address mapper 700 converts a logical address received from the host 10 into a physical address. For example, the address mapping may be accomplished by performing an XOR operation on the physical address and key data.

The arbiter 100 determines a processing order for the requests received from the host 10 and stores the received requests in the request queue 500. The arbiter 100 determines whether a requested physical address is relatively more likely to be attacked by referring to the address cache 300, and interfaces with the write cache 400 to perform a write request for the requested physical address.

The address monitor 200 monitors whether a requested physical address is relatively more likely to be attacked, and stores a physical address that is relatively more likely to be attacked in the address cache 300.

The address cache 300 is managed by the address monitor 200. The address monitor 200 stores the physical addresses that are relatively more likely to be attacked in the address cache 300. The data structure of an embodiment of the address cache 300 will be described below.

The write cache 400 stores data associated with the physical addresses cached in the address cache 300. The data structure of an embodiment of the write cache 400 will be described below.

The request queue 500 stores requests received from the host 10 according to a processing order determined by the arbiter 200.

The command generator 600 generates a command for controlling one or more operations of the semiconductor memory device 20 according to a request provided by the request queue 500 and provides the generated command to the semiconductor memory device 20. FIG. 2 illustrates the data structure of an embodiment of the address cache 300.

Each entry in the address cache 300 may include a valid field 311, an address field 312, a write count field 313, and a least recently used (LRU) field 314.

The valid field 311 indicates whether valid data is stored in the corresponding entry of the address cache 300. The address field 312 is used to store a physical address corresponding to a write request. The physical address will also be referred to as a write address. The write count field 313 is used to store the write count for the corresponding physical address stored in the address field 312. The LRU field 314 indicates whether the corresponding entry is the least recently used entry.

Figure 3:
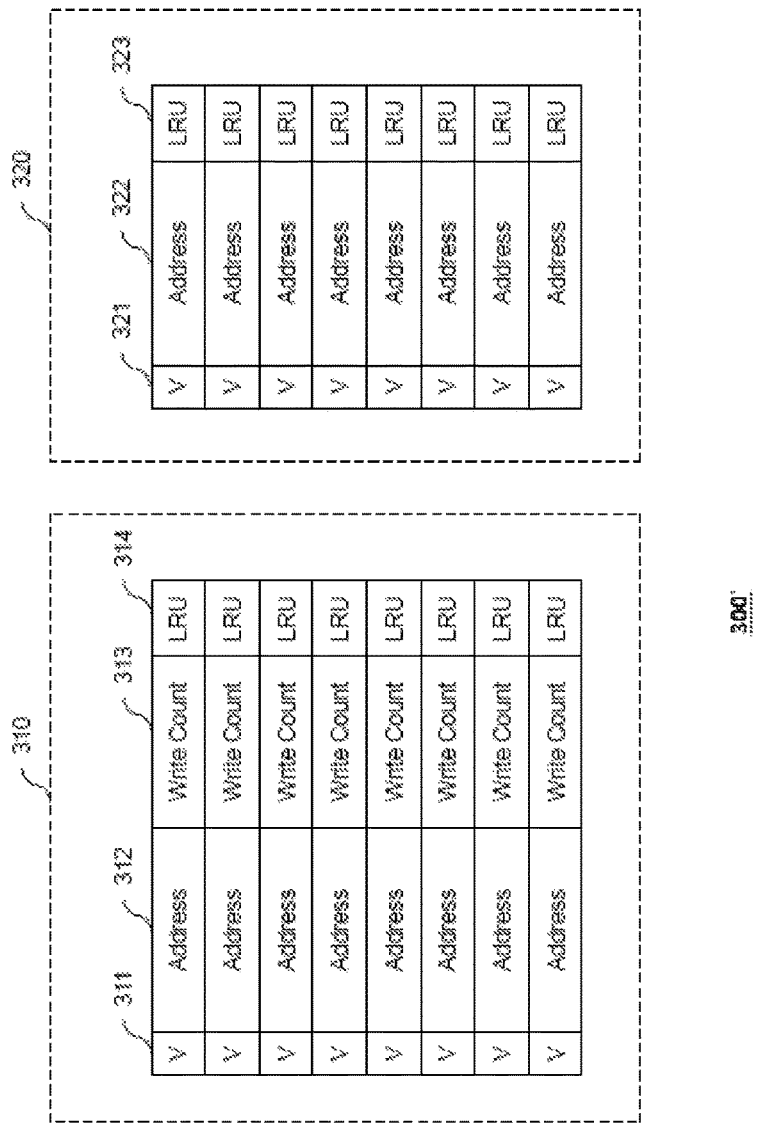
FIG. 3 illustrates the data structure of an embodiment of an address cache.

FIG. 3 illustrates the data structure of an embodiment of address cache 300'.

The address cache 300' may include a first address cache 310 and a second address cache 320.

The first address cache 310 has substantially the same data structure as the address cache 300 of FIG. 2. The first address cache 310 includes a valid field 311, an address field 312, a write count field 313, and an LRU field 314.

The second address cache 320 includes a valid field 321, an address field 322, and an LRU field 323. The valid field 321 indicates whether a corresponding entry includes valid data. The address field 322 is used to store a write address. The LRU field 323 indicates whether the corresponding entry is the least recently used entry.

The address cache 300' illustrated in FIG. 3 has a multi-step cache structure, unlike the address cache 300 illustrated in FIG. 2. The address cache will be described below with reference to FIGS. 5 and 6.

Figure 4:
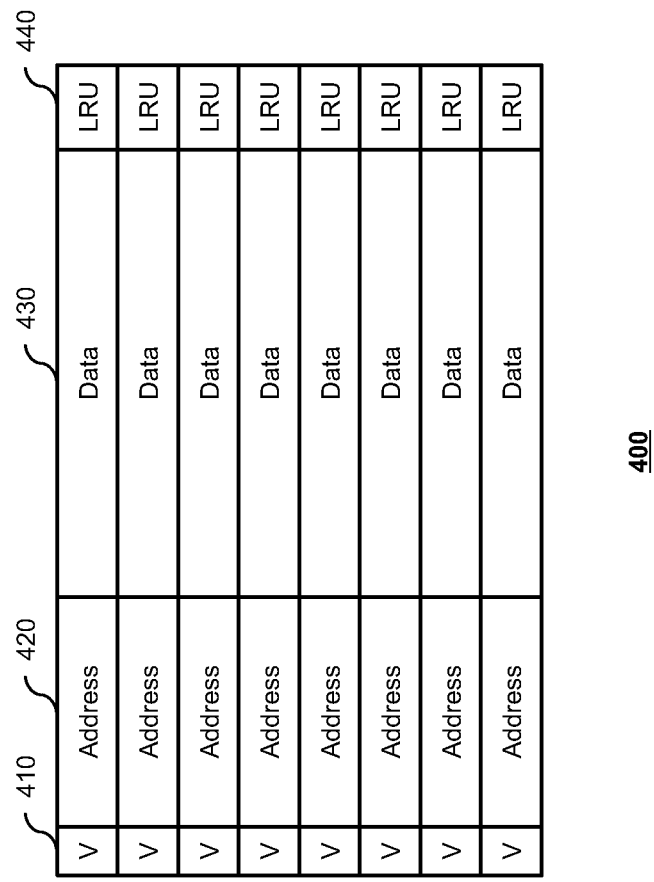
FIG. 4 illustrates the data structure of an embodiment of a write cache.

FIG. 4 illustrates the data structure of an embodiment of the write cache 400 of FIG. 1.

The write cache 400 may include a valid field 410, an address field 420, a data field 430, and an LRU field 440.

The valid field 410 indicates whether an entry in the write cache includes valid information. The address field 420 is used to store a physical address. The data field 430 is used to store data corresponding to the physical address stored in the address field 420. The LRU 440 indicates whether the entry in the write cache 400 is the least recently used entry.

Figure 5:
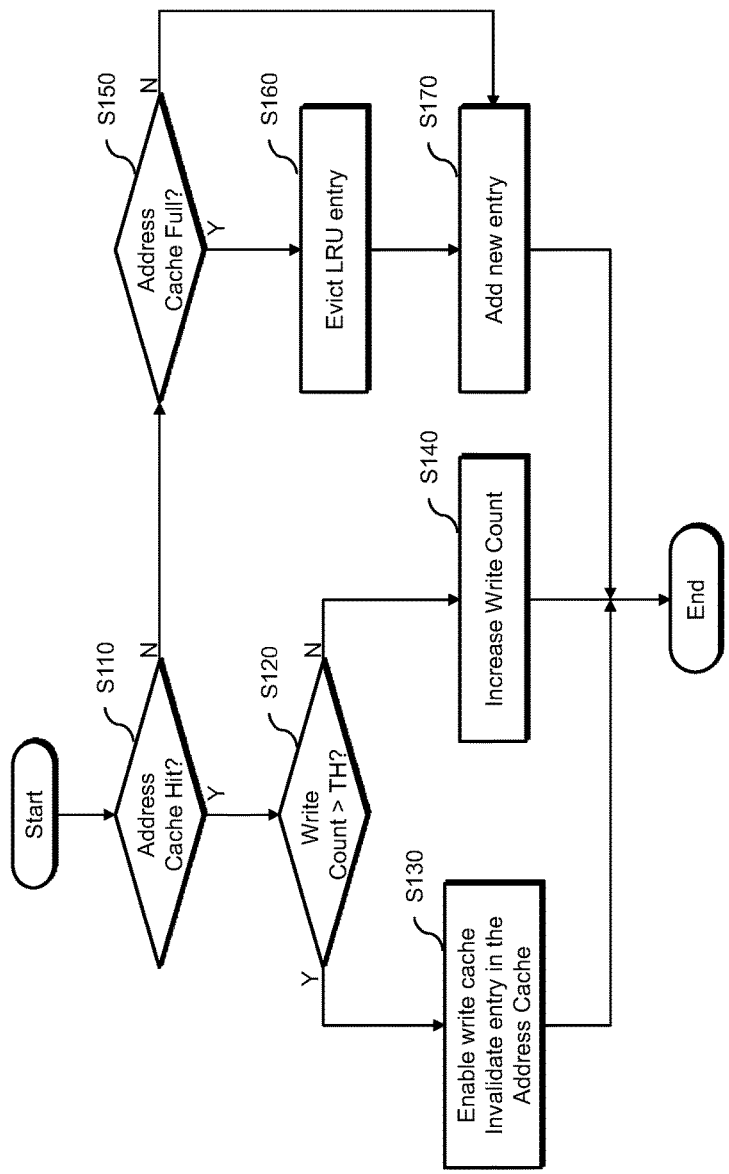
FIG. 5 is a flowchart representation of an example of an operation of an embodiment of the address monitor associated with a write request received at the semiconductor device including the address cache of FIG. 2.

FIG. 5 is a flowchart representation of an example of an operation of an embodiment of the address monitor 200 associated with a write request received at the semiconductor device 1000 including the address cache 300 of FIG. 2.

The address monitor 200 determines whether a write address associated with a write request received from a host 10 is stored in the address cache 300 at step 110.

If the write address is stored in the address cache 300, the address monitor 200 determines whether the write count stored in the write count field 313 associated with the write address in the address cache 300 exceeds a threshold value at step S120.

If the write count exceeds the threshold value, the address monitor 200 issues an activated control signal to the arbiter 100 to cache the write address and data associated with the received write address in the write cache 400 and invalidates the value of the valid field 311 associated with the write address in the address cache 300 at step S130. The operation ends following the implementation of step S130.

The arbiter 100 performs a write cache operation to cache a write request in the write cache 400 when a control signal received from the address monitor 200 is an activated control signal.

In response to the activated control signal, the arbiter 100 determines whether the write address is present in the write cache 400. If the write address is present in the write cache 400, the arbiter 100 stores write data in the data field 430 associated with the write address. If the write address is not present in the write cache 400, the arbiter 100 creates a new entry for the write address and the write data in the write cache 400. If the write cache 400 is full, the arbiter 100 identifies the least recently used entry in the write cache 400 by referring to the LRU field, and replaces the least recently used entry with a new entry including the write address and write data.

If a cached write address and write data associated with a write request is present in the request queue 500, the arbiter 100 removes the write request from the request queue 500.

If the write count does not exceed the threshold value at step S120, the address monitor 200 increases the value of the write count field 313 corresponding to the write address in address cache 300 at step S140 and the operation ends.

If it is determined at step 110 that the write address is not present in the address cache 300, the address monitor 200 determines whether the address cache 300 is full, at step S150.

If the address cache 300 is full, the address monitor 200 removes the least recently used entry from the address cache 300 by referring to the LRU field 314 of the address cache 300 at step S160.

The address monitor 200 replaces the removed entry with a new entry that includes the write address in the address cache at step S170 and the operation ends.

If the address cache 300 is not full, the address monitor 200 creates a new entry and stores the write address in the address cache 300 at step S170 and the operation ends.

Figure 6:
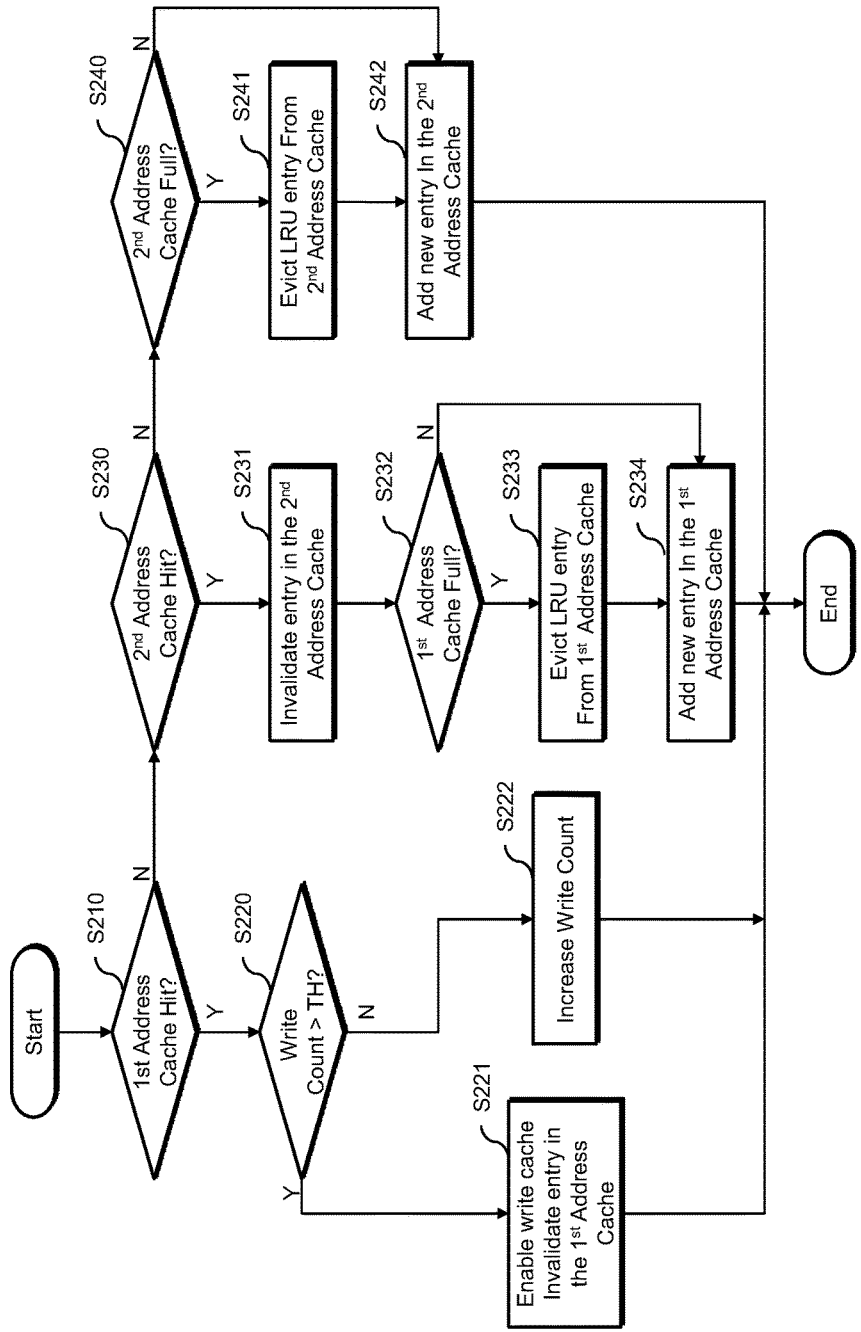
FIG. 6 is a flowchart representation of an example of an operation of an embodiment of the address monitor associated with a write request received at a semiconductor device including the address cache of FIG. 3.

FIG. 6 is a flowchart representation of an example of an operation of an embodiment of the address monitor 200 associated with a write request received at a semiconductor device 1000 including the address cache 300' of FIG. 3.

When a write request is received from the host 10, the address monitor 200 determines whether a physical address (also referred to as a write address) corresponding to the received write request is present in the first address cache 310 at step S210.

If the write address is present in the first address cache 310, the address monitor 200 determines whether the write count associated with the received write request exceeds the threshold value by referring to the write count field 313 at step S220.

If the write count exceeds the threshold value, the address monitor 200 issues an activated control signal to the arbiter 100 and the arbiter 100 responsively caches the write address and write data associated with the write request in the write cache 400. The address monitor 200 removes the write address associated with the write request from the first address cache 310 or invalidates the valid field 311 corresponding to the write address at step S221 and then the operation ends.

The arbiter 100 performs the write cache operation to cache the write request in the write cache 400 when the control signal received from the address monitor 200 is an activated control signal.

The arbiter 100 determines whether the write address associated with the write request is present in the write cache 400. If the physical address is present in the write cache 400, the arbiter 100 stores the write data associated with the write request in the data field 430 corresponding to the write address associated with the write request. If the write address is not present in the write cache 400, the arbiter 100 creates a new entry in the write cache 400 and stores the write address and the write data in the newly formed entry in the write cache 400. If the write cache 400 is full, the arbiter 100 may identify the least recently used entry in the write cache 400 by referring to the LRU field, remove the identified entry and store the write address and the write data associated with the write request as a new entry in the write cache.

If a cached write request is present in the request queue 500, the arbiter 100 removes the write request from the request queue 500.

If it is determined that the write count does not exceeds the threshold value at step S220, the address monitor 200 increases the write count for the write address in the first address cache 310 at step S222 and the operation ends.

If the write address associated with the write request is determined to not be present in the first address cache 310, the operation proceeds to step S230 where the address monitor 200 determines whether the write address is present in the second address cache 320.

If the write address associated with the write request is determined to be present in the second address cache 320 at step S230, the address monitor 200 invalidates the entry associated with the write address in the second address cache at step S231.

The address monitor 200 determines whether the first address cache 310 is full at step S232.

If the first address cache 310 is not full, the address monitor 200 creates a new entry and stores the write address as the new entry in the address cache 310 at step S234 and the operation ends.

If the first address cache 310 is full, the address monitor 200 removes the entry associated with least recently used write address from the first address cache 310 at step S233, creates a new entry in the first address cache 310 and stores the write address in the new entry at step S234 and the operation ends.

If it is determined that the write address associated with the write request is not present in the second address cache 320 at step S230, the address monitor 200 determines whether the second address cache 320 is full at step S240.

If the second address cache 320 is not full, the address monitor 200 creates a new entry in the second address cache 320 and stores the write address in the newly created entry at step S242 and the operation ends.

If the second address cache 320 is full, the address monitor 200 identifies the entry associated with the least recently used write address and removes the least recently used entry from the second address cache 320 at step S241. The address monitor 200 creates a new entry in the second address cache 320 and stores the write address in the newly created entry at step S242, and the operation ends.

As illustrated in FIG. 6, when a write request is associated with a write address that is present in the second address cache 320, the address cache 300' of FIG. 3 transfers and stores the write address associated with the write request in the first address cache 310. When a write request is associated with a write address that is present in the first address cache 310, the address cache 300' transfers and stores the write address and write data associated with the write request in the write cache. The storage space of the address cache 300' may be relatively smaller than the storage space of the address cache 300 of FIG. 2.

Figure 7:
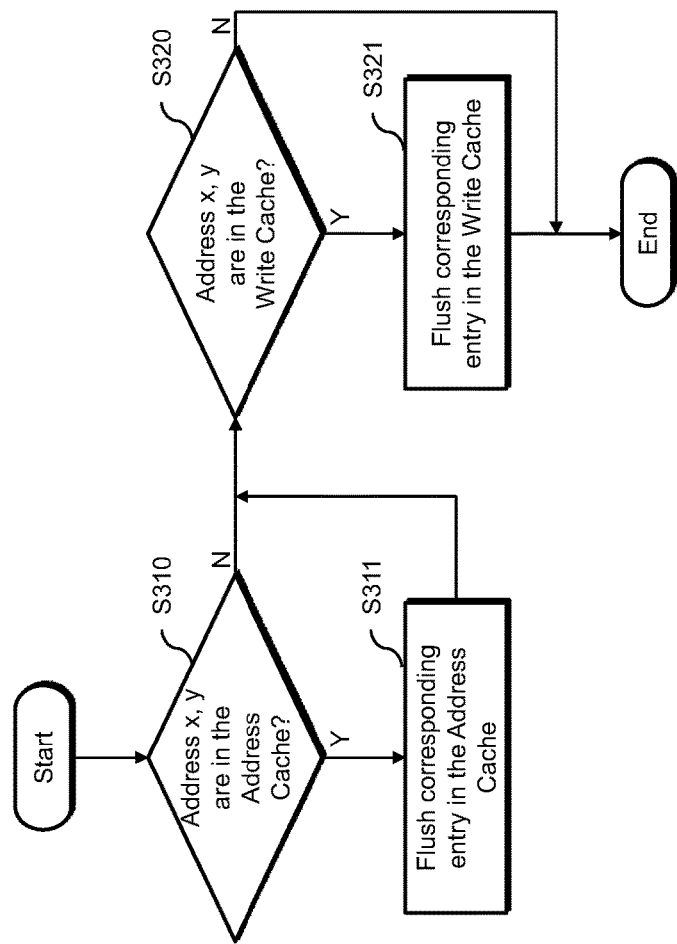
FIG. 7 is a flowchart representation of an example of an operation of an embodiment of the address monitor following the performance of the wear leveling operation when the semiconductor device include the address cache of FIG. 2.

FIG. 7 illustrates an example of an operation of an embodiment of the address monitor 200 following the performance of the wear leveling operation when the semiconductor device 1000 includes the address cache of FIG. 2.

As described above, a physical address x and a physical address y are swapped when a write count exceeds a predetermined threshold to perform the wear leveling operation.

The address monitor 200 determines whether the physical addresses x and y are present in the address cache 300 at step S310. If the physical addresses x and y are present in the address cache 300 the address monitor 200 flushes the entries associated with the physical addresses x and y in the address cache 300 at step S311 and the operation proceeds to step S320. If the physical addresses x and y are not present in the address cache 300, the operation proceeds to step S320.

Figure 8:
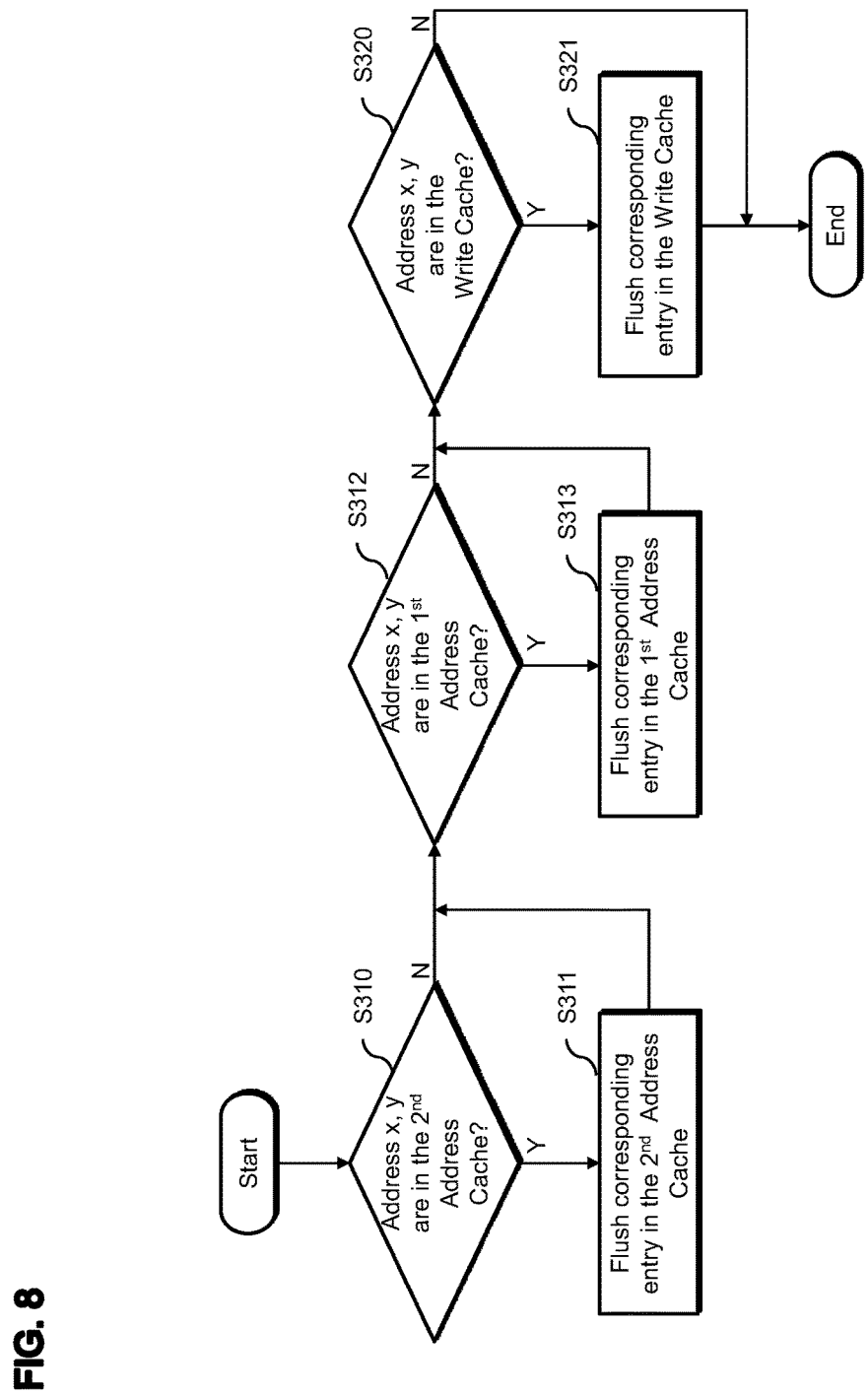
FIG. 8 is a flowchart representation of an example of an operation of an embodiment of the address monitor following the performance of the wear leveling operation when the semiconductor device include the address cache of FIG. 3.

The address monitor 200 determines whether the physical addresses x and y are present in the write cache 400 at step S320. If the physical addresses x and y are present in the write cache 400, the address monitor 200 flushes the entries corresponding to the physical addresses x and y in the write cache 400 at step S321, and the operation ends. If the physical addresses x and y are not present in the write cache 400, the operation ends. FIG. 8 illustrates an example of an operation of an embodiment of the address monitor 200 following the performance of a wear leveling operation when the semiconductor device 1000 includes an address cache 300' that is configured in two stages as illustrated in FIG. 3.

As described above, a physical address x and a physical address y are swapped when a write count exceeds a predetermined threshold to perform the wear leveling operation.

The address monitor 200 determines whether the physical addresses x and y are present in the second address cache 320 at step S310. If the physical addresses x and y are present in the second address cache 320, the address monitor 200 flushes the entries associated with the physical addresses x and y from the second address cache 320 at step S311 and the operation proceeds to step S312. If physical addresses x and y are not present in the second address cache 320, the operation proceeds to step S312.

The address monitor 200 determines whether the physical address x and y are present in the first address cache 310 at step S312. If the physical addresses x and y are present in the first address cache 310, the address monitor 200 flushes the entries associated with the physical addresses x and y from the first address cache 310 at step S313 and the operation proceeds to step S320. If the physical addresses x and y are not present in the first address cache 310, the operation proceeds to step S320.

The address monitor 200 determines whether the physical addresses x and y are present in the write cache 400 at step S320. If the physical addresses x and y are present in the write cache 400, the address monitor 200 flushes the entries associated with the physical addresses x and y from the write cache 400 at step S321 and the operation ends. If the physical addresses x and y are not present in the write cache 400, the operation ends.

Various embodiments of the semiconductor device may improve the wear leveling operation for a semiconductor memory device, and may increase the lifespan of the semiconductor memory device. Various embodiments of the semiconductor device may reduce the amount of the storage space for storing the write count.

While certain embodiments have been described above, it will be understood to those skilled in the art that the embodiments described are by way of example only. Accordingly, the semiconductor device and operating method thereof described herein should not be limited based on the described embodiments. Rather, the semiconductor device and the operating method thereof described herein should only be limited in light of the claims that follow when taken in conjunction with the above description and accompanying drawings.

What is claimed is:

1. A semiconductor device comprising:
a first address cache configured to store a physical address of a semiconductor memory device and a write count associated with the physical address;
an address monitor configured to update the physical address and the write count in the first address cache based on a received write request;
an arbiter configured to store a write address and write data associated with the write request in a write cache in response to a command from the address monitor, wherein the command generated by the address monitor is based on the physical address and the write count in first address cache; and
an address mapper configured to convert a logical address corresponding to a write request received from a host into a physical address based on a mapping relation,
wherein the address mapper changes the mapping relation to perform wear leveling operation for the semiconductor memory device, and
wherein the write cache stores data corresponding to a physical address being mapped to a logical address when the physical address is accessed by write requests more than a threshold value and before the physical address is remapped to another logical address by the wear leveling operation.

2. The semiconductor device of claim 1, wherein the address monitor is configured to issue the command to the arbiter to store the write address and the write data in the write cache when the write address is present in the first address cache and the write count associated with the write address exceeds the threshold value.

3. The semiconductor device of claim 2, further comprising a second address cache configured to store a physical address of the semiconductor memory device.

4. The semiconductor device of claim 3, wherein the address monitor is configured to store the write address in the first address cache when the write address is not present in the first address cache and is present in the second address cache, and to stores the write address in the second address cache when the write address is not present in the first and second address caches.

5. The semiconductor device of claim 1, wherein the address mapper is configured to convert the logical address into the physical address by performing an operation on the logical address and on key data.

6. The semiconductor device of claim 1, wherein the address mapper is configured to swap the relationship between two logical addresses and two physical addresses corresponding to the two logical addresses when the write count exceeds a threshold.

7. The semiconductor device of claim 6, wherein the address monitor is configured to invalidate entries associated with the two swapped physical addresses in the first address cache.

8. The semiconductor device of claim 7, wherein the address monitor is configured to invalidate entries associated with the two swapped physical addresses in the write cache.

9. The semiconductor device of claim 1, further comprising a request queue configured to store a plurality of write requests received from the host, wherein the arbiter removes a write request from the plurality of write requests based on whether an update is made to the physical address and the write count in first address cache.

10. A system comprising:
a semiconductor memory device; and
a controller configured to control the semiconductor memory device,
wherein the controller comprises:
an address cache configured to store a physical address of the semiconductor memory device and a write count associated with the physical address;
an address monitor configured to update the physical address and the write count in the address cache based on a received write request;
an arbiter configured to store a write address and write data associated with the write request in a write cache in response to a command from the address monitor, wherein the command generated by the address monitor is based on the physical address and the write count in the address cache, and
an address mapper configured to convert a logical address corresponding to a write request received from a host into a physical address based on a mapping relation,
wherein the address mapper changes the mapping relation to perform wear leveling operation for the semiconductor memory device, and
wherein the write cache stores data corresponding to a physical address being mapped to a logical address when the physical address is accessed by write requests more than a threshold value and before the physical address is remapped to another logical address by the wear leveling operation.

11. An operating method of a semiconductor device, comprising:
determining whether a write address associated with a write request to a semiconductor memory device is present in a first address cache; and
performing the write request on a write cache instead of the semiconductor memory device when a write count associated with the write address stored in the first address cache exceeds a threshold value,
wherein the write cache stores data corresponding to a physical address being mapped to a logical address when the physical address is accessed by write requests more than a threshold value and before the physical address is remapped to another logical address by wear leveling operation for the semiconductor memory device.

12. The operating method of claim 11, further comprising storing the write address in the first address cache when the write address is not present in the first address cache.

13. The operating method of claim 11, further comprising:
determining whether the write address is present in a second address cache, when the write address is not present in the first address cache;
storing the write address in the first address cache and removing the write address from the second address cache, when the write address is present in the second address cache; and
storing the write address in the second address cache, when the write address is not present in the second address cache.

14. The operating method of claim 11, further comprising performing the wear leveling operation for the semiconductor memory device by swapping a relationship between a first physical address and a first logical address corresponding to the first physical address and the relationship between a second physical address and a second logical address corresponding to a second physical address when the write count exceeds the threshold.

15. The operating method of claim 14, further comprising removing entries associated with the first and second physical addresses from the first address cache.

16. The operating method of claim 15, further comprising removing entries associated with the first and second physical addresses from the write cache.

* * * * *